(12) United States Patent
Solbrig et al.

(10) Patent No.: US 10,641,147 B2
(45) Date of Patent: May 5, 2020

(54) EXHAUST GAS TREATMENT SYSTEMS UTILIZING A SINGLE ELECTRICALLY HEATED CATALYST

(71) Applicant: GM GLOBAL TECHNOLOGY OPERATIONS LLC, Detroit, MI (US)

(72) Inventors: Charles Solbrig, Ypsilanti, MI (US); Yong Miao, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 15/660,233

(22) Filed: Jul. 26, 2017

(65) Prior Publication Data

US 2019/0032533 A1 Jan. 31, 2019

(51) Int. Cl.
*F01N 3/02* (2006.01)
*F01N 3/08* (2006.01)
(Continued)

(52) U.S. Cl.
CPC ......... *F01N 3/2013* (2013.01); *B01D 53/944* (2013.01); *B01D 53/9418* (2013.01); *B01D 53/9477* (2013.01); *B01J 21/04* (2013.01); *B01J 23/002* (2013.01); *B01J 23/06* (2013.01); *B01J 23/42* (2013.01); *B01J 23/44* (2013.01); *B01J 23/462* (2013.01); *B01J 23/464* (2013.01); *B01J 23/466* (2013.01); *B01J 23/468* (2013.01); *B01J 23/58* (2013.01); *B01J 23/60* (2013.01); *B01J 23/63* (2013.01); *B01J 23/745* (2013.01); *B01J 23/894* (2013.01); *B01J 23/8946* (2013.01); *B01J 35/0006* (2013.01); *B01J 35/04* (2013.01); *B01J 37/0215* (2013.01); *B01J 37/0244* (2013.01); *F01N 3/0814* (2013.01); *F01N 3/0835* (2013.01); *F01N 3/0842* (2013.01);
(Continued)

(58) Field of Classification Search
CPC ........ F01N 3/035; F01N 3/103; F01N 3/2013; F01N 3/0218; F01N 3/101; F01N 3/2006; F01N 3/2033; F01N 3/2066; F01N 3/0814; F01N 3/2026; F01N 2330/02; F01N 2330/06; F01N 2330/10; F01N 2330/12; F01N 2610/02
USPC .......................... 60/274, 286, 295, 299–301
See application file for complete search history.

(56) References Cited

U.S. PATENT DOCUMENTS 8,505,282 B2   8/2013   Gonze et al.
8,813,478 B2   8/2014   Gonze et al.
(Continued)

*Primary Examiner* — Patrick D Maines
*Assistant Examiner* — Dapinder Singh

(57) ABSTRACT

Exhaust gas systems include an oxidation catalyst (OC) capable of receiving exhaust gas and oxidizing one or more of combustible hydrocarbons (HC) and one or more nitrogen oxide (NOx) species, a selective catalytic reduction device (SCR) disposed downstream from and in fluid communication with the OC via a conduit, and an electrically heated catalyst (EHC) disposed at least partially within the conduit downstream from the OC and upstream from the SCR. The EHC comprises a heating element having an outer surface including one or more second oxidation catalyst materials capable of oxidizing CO, HC, and one or more NOx species. The OC includes one or more storage materials individually or collectively capable of storing NOx and/or HC species. Exhaust gas can be supplied by an internal combustion engine which can optionally power a vehicle.

20 Claims, 2 Drawing Sheets

(51) Int. Cl.
*F01N 3/10* (2006.01)
*F01N 3/20* (2006.01)
*B01D 53/94* (2006.01)
*F01N 13/00* (2010.01)
*B01J 35/00* (2006.01)
*B01J 23/42* (2006.01)
*B01J 23/44* (2006.01)
*B01J 23/46* (2006.01)
*B01J 23/745* (2006.01)
*B01J 23/06* (2006.01)
*B01J 21/04* (2006.01)
*B01J 23/00* (2006.01)
*B01J 23/63* (2006.01)
*B01J 23/89* (2006.01)
*B01J 37/02* (2006.01)
*B01J 23/60* (2006.01)
*B01J 23/58* (2006.01)
*B01J 35/04* (2006.01)

(52) U.S. Cl.
CPC ............. *F01N 3/103* (2013.01); *F01N 3/106* (2013.01); *F01N 3/208* (2013.01); *F01N 3/2026* (2013.01); *F01N 3/2066* (2013.01); *F01N 13/009* (2014.06); *B01D 2251/206* (2013.01); *B01D 2255/102* (2013.01); *B01D 2255/904* (2013.01); *B01D 2255/91* (2013.01); *B01D 2255/912* (2013.01); *F01N 2240/16* (2013.01); *F01N 2370/02* (2013.01); *F01N 2510/02* (2013.01); *F01N 2510/06* (2013.01); *F01N 2610/00* (2013.01); *F01N 2610/1453* (2013.01)

(56) References Cited

U.S. PATENT DOCUMENTS

| | | | | |
|---|---|---|---|---|
| 2012/0060471 | A1* | 3/2012 | Gonze | F01N 3/035 60/274 |
| 2013/0111886 | A1* | 5/2013 | Gonze | F01N 9/00 60/286 |
| 2014/0311131 | A1* | 10/2014 | Kondo | F01N 3/22 60/285 |
| 2015/0267596 | A1* | 9/2015 | Tobben | F01N 3/0253 60/274 |
| 2016/0215675 | A1* | 7/2016 | Muruganantham | B01D 53/9418 |
| 2017/0204763 | A1* | 7/2017 | Nishioka | F01N 3/2066 |
| 2017/0298796 | A1* | 10/2017 | Naseri | F01N 3/2066 |

* cited by examiner

EXHAUST GAS TREATMENT SYSTEMS UTILIZING A SINGLE ELECTRICALLY HEATED CATALYST

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons (HC), oxides of nitrogen ($NO_x$), and oxides of sulfur (SOx), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. Another type of exhaust treatment device is an oxidation catalyst (OC) device, which is commonly positioned upstream from a SCR to serve several catalytic functions, including oxidizing HC and CO species. Further, OCs can convert NO into $NO_2$ to alter the $NO:NO_x$ ratio of exhaust gas in order to increase the $NO_x$ reduction efficiency of the downstream SCR. Initial heating (e.g., during vehicle cold starts) of exhaust gas treatment devices remains a challenge.

SUMMARY

Provided is an exhaust gas treatment system including an oxidation catalytic device (OC) configured to receive exhaust gas at an upstream side and release exhaust gas at a downstream side and having a catalytic composition, a selective catalytic reduction device (SCR) disposed downstream from the OC and in fluid communication therewith via a conduit, a reductant injector configured to deliver reductant into the conduit at a reductant injection position between the OC and the SCR, and an electrically heated catalyst (EHC) disposed at least partially within the conduit downstream from the OC and upstream from the reductant injection position. The catalytic composition can include one or more first oxidation catalyst materials capable of oxidizing carbon monoxide (CO), hydrocarbons (HC), and one or more nitrogen oxide (NOx) species, and one or more storage materials individually or collectively capable of storing NOx and HC species. The SCR can be configured to store NOx species and/or reduce NOx species in the presence of a reductant. The EHC can include a heating element having an outer surface including one or more second oxidation catalyst materials capable of oxidizing CO, HC, and one or more NOx species. The one or more first oxidation catalyst materials and/or second oxidation catalyst materials can include platinum group metal catalysts and/or metal oxide catalysts. The one or more platinum group metal catalysts can include platinum, palladium, rhodium, ruthenium, osmium, and/or iridium. The one or more metal oxide catalysts can include iron oxides, zinc oxides, aluminum oxides, and/or perovskites. The storage material can be a NOx storage material and can include one or more of an alkali metal, alkaline earth metal, and/or a rare earth metal, including respective oxides, carbonates, and hydroxides thereof. The storage material can be a HC storage material and can include one or more of alumina, silica, zeolite, zirconia, titania, and lanthana. The storage material can be a cold storage material capable of storing NOx species and/or HC species at a relatively lower temperature and releasing stored NOx species and/or HC species at a relatively higher temperature. The reductant can be one or more of urea and/or decomposition products thereof, ammonia, and compounds capable of decomposing or otherwise reacting in the presence of exhaust gas and/or heat to form ammonia. The heating element can be disposed in a coiled configuration. At least a portion of the conduit between the OC and the SCR can be insulated.

Provided is an internal combustion engine (ICE) exhaust gas treatment system including an ICE configured to emit exhaust gas to a conduit, an oxidation catalytic device (OC) configured to receive exhaust gas from the ICE via the conduit at an upstream side and release exhaust gas into the conduit at a downstream side and having a catalytic composition, a selective catalytic reduction device (SCR) disposed downstream from the OC and in fluid communication therewith via the conduit, and an electrically heated catalyst (EHC) disposed at least partially within the conduit downstream from the OC and upstream from the SCR. The catalytic composition can include one or more first oxidation catalyst materials capable of oxidizing carbon monoxide (CO), hydrocarbons (HC), and one or more nitrogen oxide (NOx) species, and at least one storage material capable of storing NOx and/or HC species. The SCR can be configured to store NOx species and/or reduce NOx species in the presence of a reductant. The EHC can include a heating element having an outer surface including one or more second oxidation catalyst materials capable of oxidizing CO, HC, and one or more NOx species. The one or more first oxidation catalyst materials and/or second oxidation catalyst materials can include platinum group metal catalysts. The one or more platinum group metal catalysts can include platinum, palladium, rhodium, ruthenium, osmium, and/or iridium. The one or more first oxidation catalyst materials and/or second oxidation catalyst materials can include metal oxide catalysts. The one or more metal oxide catalysts can include iron oxides, zinc oxides, aluminum oxides, and/or perovskites. The storage material can be a NOx storage material and can include one or more of an alkali metal, alkaline earth metal, and/or a rare earth metal, including respective oxides, carbonates, and hydroxides thereof. The storage material can be a HC storage material and can include one or more of a porous ceramic matrix or a molecular sieve. The storage material can be a cold storage material. The EHC can be contiguous with a downstream side of the OC catalytic composition. NOx species and/or HC species which pass through the OC unoxidized can be oxidized by the second oxidation catalyst materials.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to systems and methods for heating exhaust gas treatment systems, particularly those including oxidation catalyst devices (OC) and selective catalytic reduction devices (SCR). The systems herein utilize a single electric heating source in order to efficiently warm an OC and an SCR to improve efficiency, and emissions performance relating to NOx species, CO, and hydrocarbon (HC) species. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$. The methods disclosed herein are particularly suitable for use with internal combustion engine (ICE) exhaust gas treatment systems, although other applications are also foreseen. Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

Figure 1:
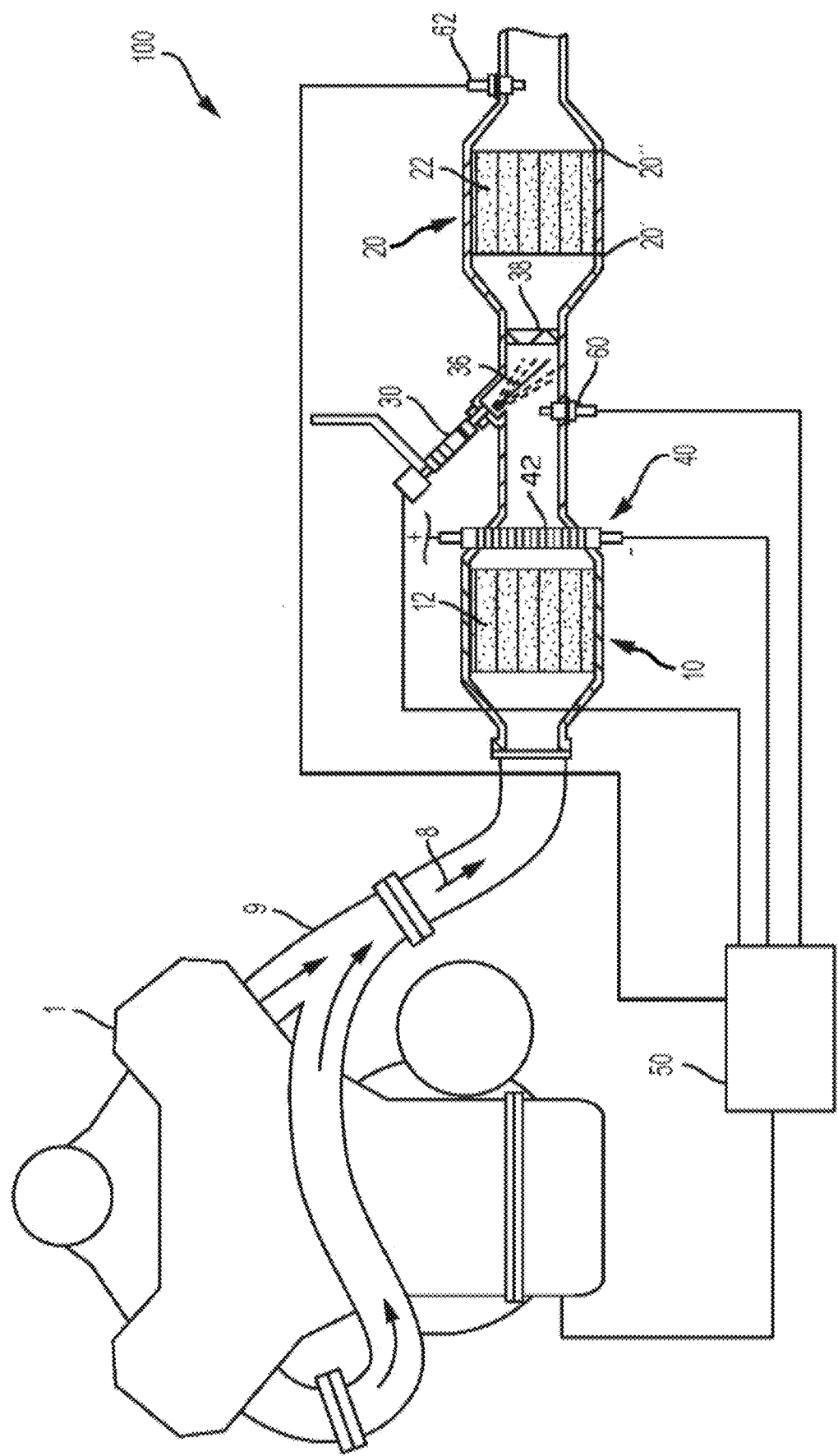
FIG. 1 illustrates an schematic view of an exhaust gas treatment system, according to one or more embodiments.

FIG. 1 illustrates an exhaust gas treatment system 100 utilizing one or more OCs for treating and/or monitoring gas species, such as species of exhaust gas 8 generated by an ICE 1. System 100 generally includes one or more exhaust gas conduits 9, and one or more downstream exhaust treatment devices. Upstream and downstream are defined in relation to the direction of the flow of exhaust gas 8 from ICE 1. As used herein, a plurality of elements described as being upstream and/or downstream from each other are necessarily in fluid communication with each other. The exhaust gas conduit 9, which can comprise several segments, transports exhaust gas 8 from the ICE 1 to the various exhaust treatment devices of the exhaust gas treatment system 100. ICE 1 is included in system 100 for the purposes of illustration only, and the disclosure herein is not to be limited to gas sources provided by ICEs. It should be further understood that the embodiments disclosed herein may be applicable to treatment of any exhaust streams including NOx, carbon monoxide (CO), HC, or other chemical species which are desirably combusted or otherwise oxidized by OCs.

ICE 1 can include one or more cylinders (not shown) capable of each accepting a piston (not shown) which can reciprocate therein. Air and fuel are combusted in the one or more cylinders thereby reciprocating the appurtenant pistons therein. The pistons can be attached to a crankshaft (not shown) operably attached to a vehicle driveline (not shown) in order to deliver tractive torque thereto, for example. Exhaust gas 8 can generally include: CO, HC, water, and oxides of nitrogen ($NO_x$). Constituents of exhaust gas, as used herein, are not limited to gaseous species. HC refers to combustible chemical species comprising hydrogen and carbon, and generally includes one or more chemical species of gasoline, diesel fuel, or the like. Exhaust gas 8 is expelled from ICE 1 and sequentially communicated to OC 10, and selective catalytic reduction device (SCR) 20. A reductant injector 30 is configured to inject reductant 36 into exhaust gas conduit 9 downstream from OC 10 and upstream from SCR 20. An electrically heated catalyst (EHC) is disposed at least partially within conduit 9 between OC 10 and upstream from SCR 20. System 100 can optionally include a particulate filter device (not shown). Exhaust gas 8 is can be expelled from system 100 via a vehicle tailpipe, for example.

System 100 can further include a control module 50 operably connected via a number of sensors to monitor ICE 1 and/or the exhaust gas treatment system 100. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 1, OC 10, SCR 20, EHC 40, and/or one or more sensors. For example, as shown, control module 50 is in communication with an $NO_x$ sensors 60, and 62.

In general, the SCR 20 includes all devices which utilize a reductant 36 and a catalyst to reduce NOx species to desired chemical species, including diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$) which is capable of decomposing or otherwise reacting in the presence of exhaust gas and/or heat into $NH_3$. Additionally or alternatively, reductant 36 can be any compound capable of decomposing or reacting in the presence of exhaust gas 8 and/or heat to form ammonia. The reductant 36 can be diluted with water in various implementations. In implementations where the reductant 36 is diluted with water, heat (e.g., from the exhaust) evaporates the water, and ammonia is supplied to the SCR 20. Non-ammonia reductants can be used as a full or partial alternative to ammonia as desired. In implementations where the reductant 36 includes urea, the urea reacts with the exhaust to produce ammonia, and ammonia is supplied to the SCR 20. Equation (1) below provides an exemplary chemical reaction of ammonia production via urea decomposition.

$$CO(NH_2)_2 + H_2O \rightarrow 2NH_3 + CO_2 \qquad (1)$$

It should be appreciated that Equation (1) is merely illustrative, and is not meant to confine the urea or other reductant 36 decomposition to a particular single mechanism, nor preclude the operation of other mechanisms. Efficient decomposition urea to $NH_3$ typically requires temperatures in excess of about 200° C., and, depending on the amount of urea injected, for example relative to a flow rate of exhaust gas 8, urea can crystallize in temperatures less than about 200° C. Accordingly, reductant 36 injection events and/or dosing quantities are typically determined based upon system temperature and exhaust gas 8 flow rate, among others, such that urea decomposition yield is maximized and urea crystallization is minimized.

Equations (2)-(6) provide exemplary chemical reactions for $NO_x$ reduction involving ammonia.

$$6NO + 4NH_3 \rightarrow 5N_2 + 6H_2O \qquad (2)$$

$$4NO + 4NH_3 + O_2 \rightarrow 4N_2 + 6H_2O \qquad (3)$$

$$6NO_2 + 8NH_3 \rightarrow 7N_2 + 12H_2O \qquad (4)$$

$$2NO_2 + 4NH_3 + O_2 \rightarrow 3N_2 + 6H_2O \qquad (5)$$

$$NO + NO_2 + 2NH_3 \rightarrow 2N_2 + 3H_2O \qquad (6)$$

It should be appreciated that Equations (2)-(6) are merely illustrative, and are not meant to confine SCR 20 to a particular $NO_x$ reduction mechanism or mechanisms, nor preclude the operation of other mechanisms. SCR 20 can be configured to perform any one of the above $NO_x$ reduction reactions, combinations of the above $NO_x$ reduction reactions, and other $NO_x$ reduction reactions.

As shown in FIG. 1, SCR 20 includes a catalytic composition (CC) 22 packaged in a shell or canister generally defining an upstream side 20' (i.e., inlet) and a downstream side 20" (i.e., outlet) and disposed in fluid communication with exhaust gas conduit 9 and optionally other exhaust treatment devices (e.g., OC 10). The shell or canister can comprise a substantially inert material, relative to the exhaust gas constituents, such as stainless steel. SCR 20 is configured to receive exhaust gas 8 and reductant 36 at upstream side 20'. Reductant 36 can be supplied from a reductant reservoir (not shown) and injected into the exhaust gas conduit 9 at a location upstream from SCR 20 via an injector 30, or other suitable delivery means. Reductant 36 can be in the form of a gas, a liquid, or an aqueous solution, such as an aqueous urea solution. Reductant 36 can be mixed with air in the injector 30 to aid in the dispersion of the injected spray. A turbulator 38 (i.e., mixer) can also be disposed within the exhaust conduit 9 in close proximity to the injector 30 and/or the SCR 20 to further assist in thorough mixing of reductant 36 with the exhaust gas 8 and/or even distribution throughout the SCR 20, and particularly throughout CC 22. A reference made to the position of injector 30 refers to the position at which injector 30 injects reductant 36 into conduit 9, and one of skill in the art will recognize that the position of the physical injector 30 may vary in all directions outside of conduit 9. Turbulator 38 can comprise a fixed or movable body configured to mix, vaporize, and/or otherwise contact reductant 36 within conduit 9. For example, turbulator 38 can comprise a rotating body including one or a plurality of vanes. Turbulator 38 can comprise a metal or electrically conductive material.

CC 22 can be a porous and high surface area material which can operate efficiently to convert $NO_x$ constituents in the exhaust gas 8 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable CCs 22 can have high thermal structural stability, particularly when used in tandem with PFs or when incorporated into selective catalytic reduction filter devices (SCRF), which are regenerated via high temperature exhaust soot burning techniques. CC 22 can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

SCR 20 can have a light-off temperature above which CC 22 exhibits desired or suitable catalytic activity or yield (e.g., reduction of NOx species). The light-off temperature can be dependent upon the type of catalytic materials of which CC 22 is comprised, and the amount of catalytic materials present in SCR 20, among other factors. For example, a CC 22 comprising $V_2O_5$ can have a light off temperature of about 300° C. In another example, a CC 22 comprising Fe-impregnated zeolite can have a light off temperature of about 350° C. In another example, a CC 22 comprising Cu-impregnated zeolite can have a light off temperature of about 150° C. When SCR 20 operates at a temperature below its light-off temperature, undesired $NO_x$ breakthrough can occur wherein $NO_x$ passes through SCR 20 unreacted or unstored. $NO_x$ breakthrough can be particularly problematic immediately after engine startup and in cold conditions. $NO_x$ breakthrough can also be exacerbated by lean burn strategies commonly implemented in diesel engines, for example. Lean burn strategies coordinate combustion at higher than stoichiometric air to fuel mass ratios to improve fuel economy, and produce hot exhaust with a relatively high content of O2 and $NO_x$ species. The high O2 content can further inhibit or prevent the reduction of $NO_x$ species in some scenarios.

CC 22 can be disposed on a substrate body, such as a metal or ceramic brick, plate, or monolithic honeycomb structure. CC 22 can be deposited on the substrate body as a washcoat, for example. A monolithic honeycomb structure can include several hundred to several thousand parallel flow-through cells per square inch, although other configurations are suitable. Each of the flow-through cells can be defined by a wall surface on which CC 22 can be washcoated. The substrate body can be formed from a material capable of withstanding the temperatures and chemical environment associated with the exhaust gas 8. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can comprise, be contiguous with, or be proximate EHC 40, as will be described below. One example of an exhaust gas treatment device is a SCRF which provide the catalytic aspects of SCRs in addition to particulate filtering capabilities. Generally, an SCRF comprises CC 22 applied to a filter substrate, such as a ceramic or SiC wall flow monolith filter, wound or packed fiber filters, open cell foams, sintered metal fibers, etc. In some embodiments, the SCRF filter substrate can comprise, be contiguous with, or be proximate EHC 40, as will be described below.

The SCR 20 can store (i.e., absorb, and/or adsorb) reductant for interaction with exhaust gas 8. For example, the reductant can be stored within the SCR as ammonia. During operation of SCR 20, injected reductant 36 can be stored in SCR 20 and subsequently consumed during reduction reactions with NOx species. A given SCR has a reductant capacity, or an amount of reductant or reductant derivative it is capable of storing. The amount of reductant stored within a SCR relative to the SCR capacity can be referred to as the SCR "reductant loading", and can be indicated as a % loading (e.g., 90% reductant loading) in some instances.

OC 10 is a flow-through device comprising a catalytic composition (CC) 12 and configured to accept exhaust gas 8. OC 10 is generally utilized to oxidize various exhaust gas 8 species, including HC species, CO, and $NO_x$ species. CC 12 can be housed within a housing, such as a metal housing, having an inlet (i.e., upstream) opening and outlet (i.e., downstream) opening, or be otherwise configured to provide structural support and facilitate fluid (e.g., exhaust gas) flow through OC 10. The housing can ideally comprise a substantially inert material, relative to the exhaust gas constituents, such as stainless steel, and may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC 10 to exhaust gas conduit 9 and/or another component of the exhaust gas treatment system 100. It should be appreciated that OC 10, including the housing, can include one or more additional components for facilitating in operation of the OC 10, or exhaust gas treatment system 100, including, but not limited to, various sensors.

CC 12 can comprise many various first oxidation catalyst materials, and physical configurations thereof, for oxidizing HC, CO, and NOx. CC can further comprise a substrate such as a porous ceramic matrix or the like, for example. Substrates can comprise alumina, silica, zeolite, zirconia, titania, and/or lanthana, for example. First oxidation catalyst materials can comprise platinum group metal catalysts, metal oxide catalysts, and combinations thereof. Suitable platinum group metal catalysts can include platinum (Pt), palladium (Pd), rhodium (Rh), ruthenium (Ru), osmium (Os), or iridium (Ir), and combinations thereof, including alloys thereof. In one embodiment, suitable metals include Pt, Pd, Rh, and combinations thereof, including alloys thereof. Suitable metal oxide catalysts can include iron oxides, zinc oxides, aluminum oxides, perovskites, and combination thereof, for example. In one embodiment, CC 12 can comprise Pt and $Al_2O_3$. It is to be understood that the CC 12 is not limited to the particular examples provided, and can include any catalytically active device capable of oxidizing HC species, CO, and NOx species. In many embodiments, CC 12 comprises zeolite impregnated with one or more catalytically active base metal components. The zeolite can comprise a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ.

Further, CC 12 comprises a NOx storage material. In particular, CC 12 comprises a NOx cold storage material configured to store NOx under relatively colder conditions and release stored NOx under relatively hotter conditions. While many NOx cold storage materials are known and are suitable for use with the concept described herein, a NOx storage material can comprise an alkali metal, alkaline earth metal and/or a rare earth metal. The alkali metal can comprise one or more of potassium (K), sodium (Na), lithium (Li), and cesium (Cs), including respective oxides, carbonates, and hydroxides thereof. The alkaline earth metal can comprise one or more of magnesium (Mg), calcium (Ca), strontium (Sr), and barium (Ba), including respective oxides, carbonates, and hydroxides thereof. The rare earth metal can comprise one or more of cerium (Ce), lanthanum (La), and yttrium (Y), including respective oxides, carbonates, and hydroxides thereof. The one or more alkali metals, alkaline earth metals, and/or a rare earth metals can be configured (e.g., impregnated, coated, or otherwise activated) with a platinum group metal, and carried on a substrate, such as those described above. In one specific embodiment, CC 12 can comprise aluminum oxide, cerium oxide, and a platinum group metal. The $NO_x$ storage material can be applied in an amount of about 1 g/L to about 20 g/L, wherein g/L refers to grams of $NO_x$ storage metal per liter of volume defined by OC 10.

OC 10 can store and/or oxidize NOx species in exhaust gas 8, which, for example, may form during the combustion of fuel. For example, in some embodiments, OC 10 can be utilized to convert NO into $NO_2$ in order to optimize the exhaust gas $NO:NO_2$ ratio for downstream SCRs and/or SCRFs which generally operate more efficiently with exhaust gas feed streams having a $NO:NO_2$ ratio of about 1:1. Accordingly, OC 10 is disposed upstream from SCR 20. OC 10 can have a light-off temperature above which CC 12 exhibits desired or suitable catalytic activity relating to the oxidation of NOx species. An OC 10 NOx oxidation light-off temperature can also correspond to the temperature at which NOx species stored by CC 12 are released. The light-off temperature can be dependent upon the type of catalytic materials of which CC 12 is comprised, and the amount of catalytic materials present in OC 10, among other factors. For example, CC 12 can have a NOx oxidation light off temperature of about 150° C. to about 200° C. For example, some CCs 12 achieve 50% conversion of NOx species at about 230° C. When OC 10 operates at a temperature below its NOx oxidation light-off temperature, the $NO_2$:NOx ratio of exhaust gas 8 communicated from OC 10 to a downstream SCR 20 is not optimized.

OC 10 can additionally or alternatively store HC and/or catalyze the oxidation (e.g., combustion) of HC and CO species in exhaust gas. The substrate materials described above, including various other molecular sieve materials, can be utilized to store HC. Combustion generally involves the oxidation of HC and/or CO species in the presence of oxygen to generate heat, water, and $CO_2$. In some instances, HC and/or CO may be present in exhaust gas 8 as a consequence of undesired incomplete combustion of fuel, for example. In other instances, HC may be present in exhaust gas 8 in order to implement various ICE 1 and/or system 100 control strategies. For example, exothermic oxidation of HC can OC 10 can be utilized to oxidize HC to provide heat to system 100 to aid one or more exhaust gas treatment devices achieve light-off temperatures. OC 10 can additionally or alternatively be utilized to oxidize HC for after-injection and auxiliary-injection regeneration strategies. After-injection strategies, such as those used for regeneration of PFs and/or catalysts, manipulate engine calibrations such that fuel after-injected into the engine cylinders is expelled into the exhaust system 100 at least partially uncombusted. When the after-injected fuel contacts OC 10, heat released during oxidation of the fuel is imparted to the exhaust gas treatment system and can aid in regenerating various treatment devices, such as particular filter PFs and SCRFs, for example. Similarly, auxiliary-injection strategies, such as those used for regeneration of PFs and/or catalysts, inject fuel into system 100 downstream from ICE 1 in order to contact the fuel with OC 10 whereafter heat is released from the exothermic combustion of fuel.

OC 10 can have a light-off temperature above which CC 12 exhibits desired or suitable catalytic activity relating to the oxidation of CO and/or HC species. An OC 10 CO and/or HC light-off temperature can also correspond to the temperature at which CO and/or HC species stored by CC 12 are released. The light-off temperature can be dependent upon the type of catalytic materials of which CC 12 is comprised, and the amount of catalytic materials present in OC 10, among other factors. Generally, CC 12 can have a CO oxidation light off temperature of about 150° C. to about 175° C. For example, some CCs 12 achieve 50% conversion of NOx species at about 200° C. Generally, CC 12 can have a HC oxidation light off temperature of about 175° C. to about 250° C. For example, some CCs 12 achieve 50% conversion of NOx species at about 275° C. When OC 10 operates at a temperature below its CO and/or HC oxidation light-off temperature, undesired CO and/or HC breakthrough can occur.

System 100 is characterized by the single EHC 40 disposed between OC 10 and SCR 20. More specifically, EHC 40 is disposed downstream from OC 10 and upstream from injector 30. During a system 100 cold start, OC 10 may be storing NOx and/or HC. Many systems employ heaters upstream from OC 10, or interrelated with OC 10. However, rapid heating of OC 10 may cause the release of stored HC and/or NOx at a rate above which the OC 10 is capable of oxidizing the released HC and/or NOx. HC which slips unoxidized out of OC 10 can cause coking and catalyst poisoning within SCR 20, and NOx released from OC 10 can pass through SCR 20 unreacted if the SCR 20 is below its NOx light-off temperature and/or reductant decomposition temperature. EHC 40 is advantageously disposed such that OC 10 and SCR 20 may be simultaneously heated thereby. OC 10 is optimally dually heated from the upstream side by hot exhaust gas 8 and from the downstream side by EHC, and during heating OC 10 releases stored NOx and/or HC at a manageable rate such that HC and NOx are oxidized by either CC 12, or the second oxidation catalyst composition on EHC 40. Accordingly, HC slip and/or NOx breakthrough is eliminated or minimized. Further, the position of EHC 40 heats SCR 20 and the portion of conduit 9 disposed between OC 10 and SCR 20 such that reductant 36 can be injected, and subsequently decomposed, sooner in an ICE 1 operating cycle, with minimized reductant 36 crystallization. Thus, the performance of both OC 10 and SCR 20 are enhanced, while utilizing only a single EHC 40.

In general, EHC 40 comprises a heating element 42 through which electric current is directed in order to generate heat (e.g., via Joule heating and/or via induction heating). Heating element 42 can comprise any suitable material that is electrically conductive. EHC 40 can be disposed downstream from OC 10 and proximate thereto, or contiguous with the downstream side of OC 10. EHC 40 comprises an outer surface in fluid communication with exhaust gas conduit 9, and the outer surface comprises one or more second oxidation catalyst materials. Second oxidation catalyst materials can include the first oxidation catalyst materials described above, and, for example, can include platinum group metal catalysts, and metal oxide catalysts. Second oxidation catalyst materials can be the same as the first oxidation catalyst materials, or be different from the first oxidation catalyst materials.

EHC 40 can be selectively activated and deactivated. EHC 40 can be operatively connected to and controlled by module 50. EHC 40 can be controlled to implement a thermal management control routine of ICE 1, for example. Module 50 may also control EHC 40 to supplement ICE 1 thermal management of CC 22 temperature, thereby reducing engine wear. EHC 40 can operate at a range of voltages, for example from about 12 volts to about 48 volts, and over a range of powers, for example about 1 kilowatt to about 10 kilowatts. One of skill in the art will understand that other operating voltages and powers are within the scope of this disclosure. Heater is capable of reaching temperature of about 200° C. to about 1000° C.

Figure 2:
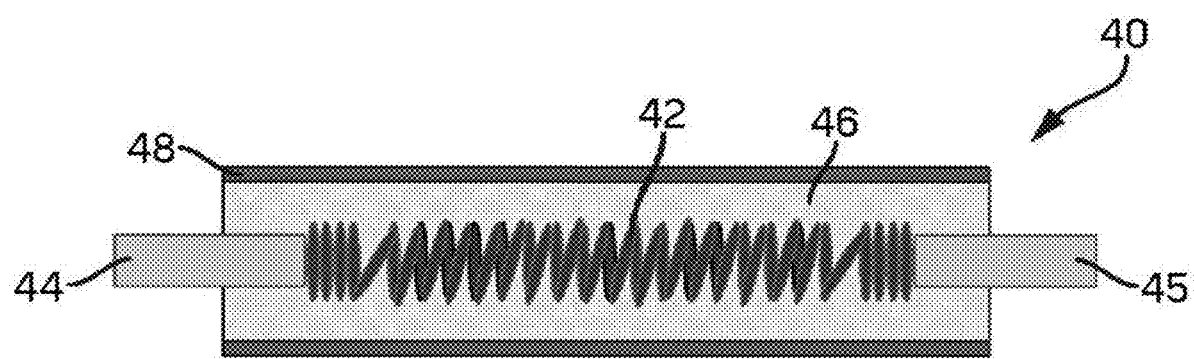
FIG. 2 illustrates a cross sectional view of an electric heater, according to one or more embodiments.

FIG. 2 illustrates a cross-sectional view of one embodiment of EHC 40, comprising heating element 42. Cold pins 44 and 45 transmit current across heating element 42 from a power source (not shown) in order to generate heat and transmit heat via heating element 42. In some embodiments, heating element 42 can comprise the outer surface of EHC 40. In some embodiments, heating element 42 can be encased in sheath 48 capable of isolating heating element 42 from external environments. EHC 40 may optionally include packing 46 in combination with sheath 48, wherein packing 46 is capable of transferring heat between heating element 42 and sheath 48. Packing 46 can be solid or porous, for example. Packing 46 can comprise magnesium oxide, in some embodiments. EHC 40 further comprises one or more oxidizing catalyst materials, as described above, such as one or more platinum group metals and/or one or more metal oxide catalysts. The one or more oxidizing catalyst materials can be applied to an outer surface of EHC 40, such that at least a portion of the oxidizing catalyst materials are disposed within conduit 9 and in fluid communication with exhaust gas 8. For example, when EHC 40 does not comprise sheath 48 and packing 46, the oxidizing catalyst can be disposed on heating element 42. When EHC 40 comprises sheath 48, the oxidizing catalyst can be disposed on and/or integrated with sheath 48.

Figure 3:
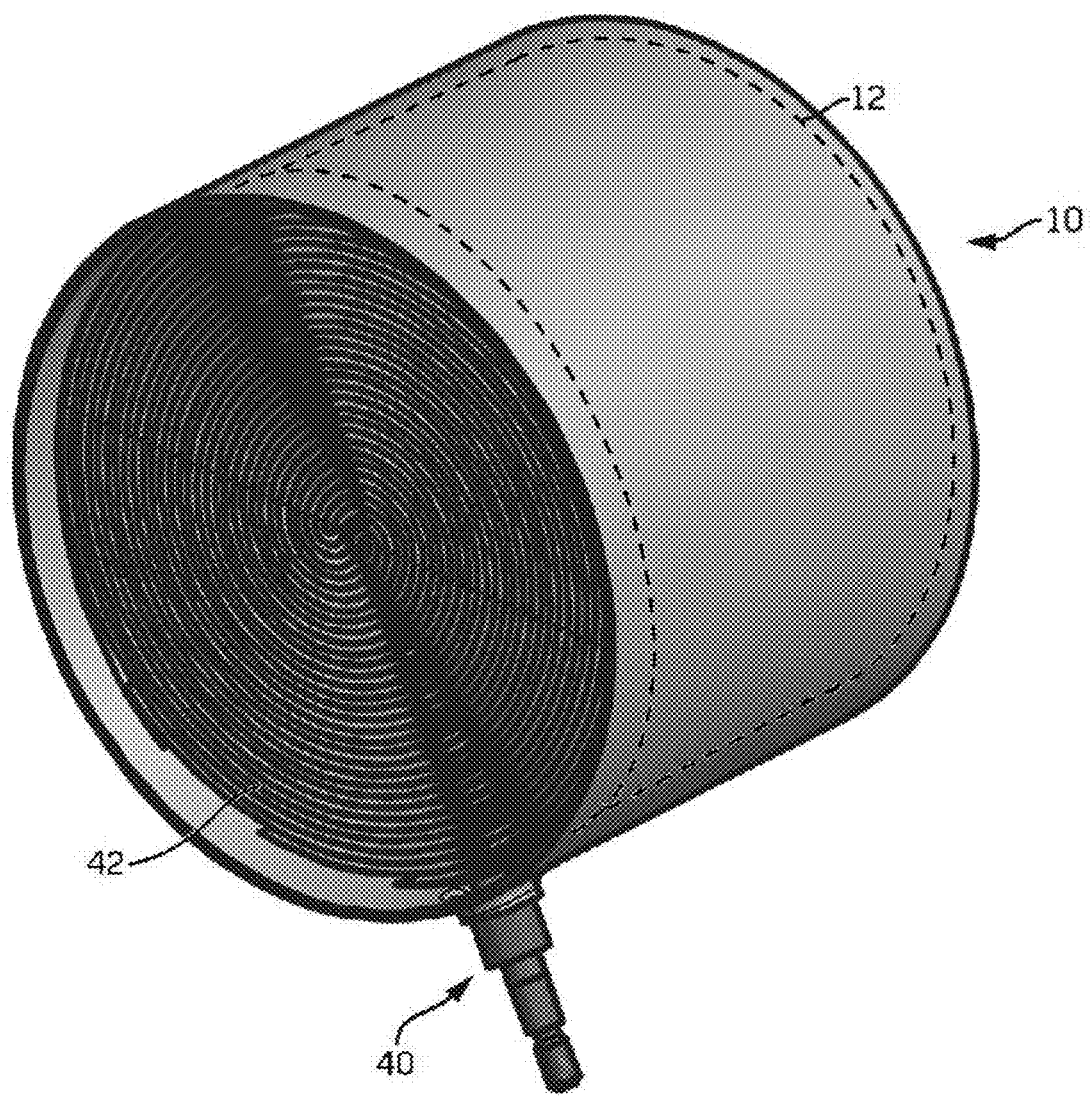
FIG. 3 illustrates a perspective view of a selective catalytic reduction device incorporating an electric heater.

Heating element 42 can comprise any shape or orientation suitable for transmitting heat to one or more of exhaust gas 8, OC 10, SCR 20, and reductant 36 while allowing suitable flow of exhaust gas 8 therepast. For example, heating element 42 can comprise a metal foil, wire, or plate. Heating element 42 can comprise a wire coil, in some embodiments. FIG. 3 illustrates a perspective view of OC 10 paired with EHC 40. Heating element 42 is coiled to form a circular cross-sectional shape which generally corresponds to inner contour of OC 10, and/or conduit 9. As shown, heating element 42 is positioned downstream from CC 12. In some embodiments, conduit 9 is at least partially insulated between OC 10 and SCR 20 to improve transfer of heat to CC 12 and CC 22, in particular.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An exhaust gas treatment system, the system comprising:
   an oxidation catalytic device (OC) configured to receive exhaust gas at an upstream side and release exhaust gas at a downstream side, and comprising a catalytic composition including:
   one or more first oxidation catalyst materials capable of oxidizing carbon monoxide (CO), hydrocarbons (HC), and one or more nitrogen oxide (NOx) species, and
   one or more storage materials individually or collectively capable of storing NOx and HC species;
   a selective catalytic reduction device (SCR) disposed downstream from the OC and in fluid communication therewith via a conduit, and configured to store NOx species and/or reduce NOx species in the presence of a reductant;
   a reductant injector configured to deliver the reductant into the conduit at a reductant injection position between the OC and the SCR; and
   an electrically heated catalyst (EHC) disposed at least partially within the conduit downstream from all catalytic composition of the OC and upstream from the reductant injection position, wherein the EHC comprises a heating element having an outer surface including one or more second oxidation catalyst materials capable of oxidizing CO, HC, and one or more NOx species and is configured to directly heat the SCR.

2. The exhaust gas treatment system of claim 1, wherein the one or more first oxidation catalyst materials and/or the second oxidation catalyst materials comprise one or more platinum group metal catalysts and/or one or more metal oxide catalysts.

3. The exhaust gas treatment system of claim 2, wherein one or more of the first oxidation catalyst materials and/or the second oxidation catalyst materials include the platinum group metal catalysts, and the one or more platinum group metal catalysts comprise platinum, palladium, rhodium, ruthenium, osmium, and/or iridium.

4. The exhaust gas treatment system of claim 2, wherein one or more of the first oxidation catalyst materials and/or the second oxidation catalyst materials include the metal oxide catalysts, and the one or more metal oxide catalysts comprise iron oxides, zinc oxides, aluminum oxides, and/or perovskites.

5. The exhaust gas treatment system of claim 1, wherein the one or more storage material comprises a NOx storage material and includes one or more of an alkali metal, alkaline earth metal, and/or a rare earth metal, including respective oxides, carbonates, and hydroxides thereof.

6. The exhaust gas treatment system of claim 1, wherein the one or more storage material comprises a HC storage material and includes one or more of alumina, silica, zeolite, zirconia, titania, and lanthana.

7. The exhaust gas treatment system of claim 1, wherein the one or more storage material comprises a cold storage material capable of storing NOx species and/or HC species at or below a threshold temperature and releasing stored NOx species and/or HC species at a temperature above the threshold temperature.

8. The exhaust gas treatment system of claim 1, wherein the reductant comprises one or more of urea and/or decomposition products thereof, ammonia, and compounds capable of decomposing or otherwise reacting in the presence of exhaust gas and/or heat to form ammonia.

9. The exhaust gas treatment system of claim 1, wherein the heating element is disposed in a coiled configuration.

10. The exhaust gas treatment system of claim 1, wherein at least a portion of the conduit between the OC and the SCR is insulated.

11. An internal combustion engine (ICE) exhaust gas treatment system, the system comprising:
    an ICE configured to emit exhaust gas to a conduit;
    an oxidation catalytic device (OC) configured to receive exhaust gas from the ICE via the conduit at an upstream side and release exhaust gas into the conduit at a downstream side, and comprising a catalytic composition including:
    one or more first oxidation catalyst materials capable of oxidizing carbon monoxide (CO), hydrocarbons (HC), and one or more nitrogen oxide (NOx) species, and
    at least one storage material capable of storing NOx and/or HC species;
    a selective catalytic reduction device (SCR) disposed downstream from the OC and in fluid communication therewith via the conduit, and configured to store NOx species and/or reduce NOx species in the presence of a reductant; and
    an electrically heated catalyst (EHC) disposed at least partially within the conduit downstream from all catalytic composition of the OC and upstream from the SCR, wherein the EHC comprises a heating element having an outer surface including one or more second oxidation catalyst materials capable of oxidizing CO, HC, and one or more NOx species, and is configured to directly heat the SCR.

12. The ICE exhaust gas treatment system of claim 11, wherein the one or more first oxidation catalyst materials and/or the second oxidation catalyst materials comprise one or more platinum group metal catalysts.

13. The ICE exhaust gas treatment system of claim 12, wherein the one or more platinum group metal catalysts comprise platinum, palladium, rhodium, ruthenium, osmium, and/or iridium.

14. The ICE exhaust gas treatment system of claim 11, wherein the one or more first oxidation catalyst materials and/or the second oxidation catalyst materials comprise one or more metal oxide catalysts.

15. The ICE exhaust gas treatment system of claim 14, wherein the one or more metal oxide catalysts comprise iron oxides, zinc oxides, aluminum oxides, and/or perovskites.

16. The ICE exhaust gas treatment system of claim 11, wherein the at least one storage material comprises a NOx storage material and includes one or more of an alkali metal, alkaline earth metal, and/or a rare earth metal, including respective oxides, carbonates, and hydroxides thereof.

17. The ICE exhaust gas treatment system of claim 11, wherein the at least one storage material comprises a HC storage material and includes one or more of a porous ceramic matrix or a molecular sieve.

18. The ICE exhaust gas treatment system of claim 11, wherein the at least one storage material comprises a cold storage material.

19. The ICE exhaust gas treatment system of claim 11, wherein the EHC is contiguous with a downstream side of the OC catalytic composition.

20. The ICE exhaust gas treatment system of claim 11, wherein the one or more NOx species and/or HC species which pass through the OC unoxidized are oxidized by the one or more second oxidation catalyst materials.

* * * * *